United States Patent [19]

Clabburn et al.

[11] Patent Number: 5,389,742
[45] Date of Patent: Feb. 14, 1995

[54] COMPOSITE ELECTRICAL INSULATOR

[75] Inventors: Robin J. T. Clabburn, Swindon; John S. T. Looms, East Molesey, both of Great Britain

[73] Assignee: Raychem Limited, Swindon, United Kingdom

[21] Appl. No.: 866,071

[22] Filed: Apr. 1, 1992

Related U.S. Application Data

[63] Continuation of Ser. No. 602,885, Oct. 24, 1990, abandoned, which is a continuation of Ser. No. 339,759, Apr. 18, 1989, abandoned, which is a continuation of Ser. No. 185,065, Feb. 12, 1988, Pat. No. 4,845,318, which is a continuation of Ser. No. 45,268, Apr. 22, 1987, abandoned, which is a continuation of Ser. No. 609,258, May 11, 1984, abandoned.

[30] Foreign Application Priority Data

May 11, 1983 [GB] United Kingdom ............... 8312892

[51] Int. Cl.⁶ .................. H01B 17/32; H01B 17/38; H01B 17/60
[52] U.S. Cl. .................................. 174/209; 174/179; 174/186; 174/211; 174/212
[58] Field of Search ............... 174/176, 177, 178, 179, 174/186, 195, 209, 210, 211, 212; 29/631

[56] References Cited

U.S. PATENT DOCUMENTS

| 3,812,284 | 5/1974 | Pohl | 174/178 X |
| 4,045,604 | 8/1977 | Clabburn | 174/179 X |
| 4,399,064 | 8/1983 | Penneck | 174/DIG. 1 |

FOREIGN PATENT DOCUMENTS

| 1470629 | 1/1967 | France | 174/179 |
| 41-6983 | 4/1966 | Japan . | |
| 49-28673 | 8/1974 | Japan . | |
| 58-158811 | 9/1983 | Japan . | |
| 286270 | 2/1928 | United Kingdom . | |
| 742801 | 1/1956 | United Kingdom | 174/70 S |
| 742837 | 1/1956 | United Kingdom | 174/70 S |
| 915052 | 1/1963 | United Kingdom . | |
| 1116197 | 6/1968 | United Kingdom | H01B 17/24 |
| 1117297 | 6/1968 | United Kingdom | 174/52 PE |
| 1209690 | 10/1970 | United Kingdom . | |
| 1292276 | 10/1972 | United Kingdom | 174/179 |
| 1313609 | 4/1973 | United Kingdom | 174/179 |
| 1450264 | 9/1976 | United Kingdom | 174/73 R |
| 2132788 | 7/1984 | United Kingdom | 350/96.23 |

*Primary Examiner*—Leo P. Picard
*Assistant Examiner*—Hyung S. Sough
*Attorney, Agent, or Firm*—Herbert G. Burkard; A. Stephen Zavell; Yuan Chao

[57] ABSTRACT

An electrical insulator comprising a cylindrical core (2) of an insulating refractory material, such as porcelain, onto a portion of the curved surface of which a sleeve (8) of insulating polymeric material is fitted. Metal end-caps (4), for electrically connecting the insulator, are fitted to the ends of the porcelain core such that there is an exposed portion (10) of the curved surface of the core between the sleeve and each end-cap. Thus, any damaging electrical activity which takes place at the metal end-caps is directed primarily onto the surface of the porcelain core (2), and not onto the surface of the electrically vulnerable polymeric sleeve (8), which serves to protect mechanically the relatively brittle porcelain core. Optionally, the polymeric sleeve (8) may have a convoluted or a shedded outer surface (12) to increase the leakage path length of the insulator, or to prevent the formation of a continuous moisture path, or both.

14 Claims, 3 Drawing Sheets

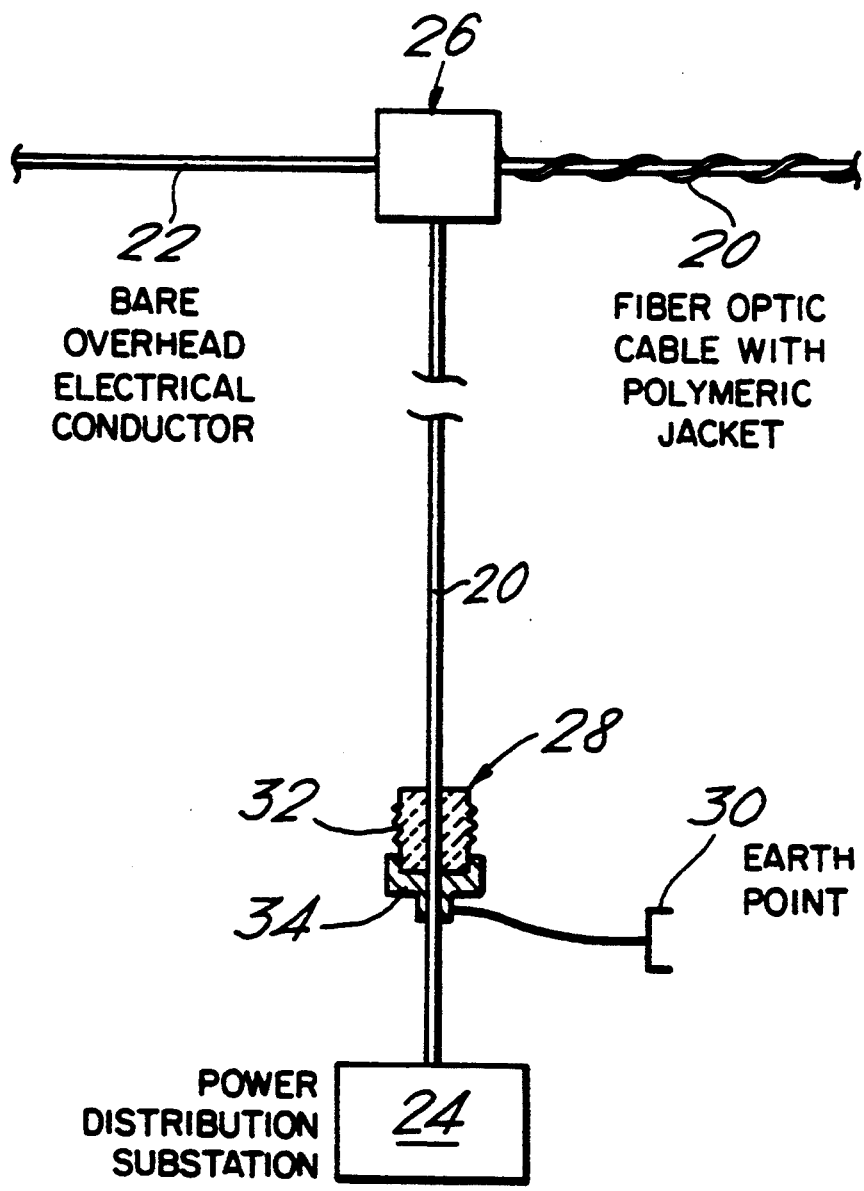

COMPOSITE ELECTRICAL INSULATOR

This application is a continuation application of application Ser. No. 07/602,885, filed Oct. 24, 1990, now abandoned, which is a continuation of application Ser. No. 07/339,759, filed Apr. 18, 1989, now abandoned, which is a continuation of application Ser. No. 07/185,065, filed Feb. 12, 1988, now U.S. Pat. No. 4,845,318, which is a continuation application of Ser. No. 07/045,268, filed Apr. 22, 1987, now abandoned, which is a continuation application Ser. No. 06/609,258, filed May 11, 1984, now abandoned.

DESCRIPTION

The present invention relates to an electrical insulator arrangement and a method of forming such an arrangement.

The insulator arrangement may comprise, for example, a high voltage (that is to say equal to or greater than about 1 kV) insulator, termination for an electric cable, bushing, lightning diverter, or arrangement for providing an earth connection to a fibre optic cable operating in a high voltage environment.

Electrical insulators, as used for example in power transmission and distribution, typically comprise an elongate body of electrically insulating material and a metal fitting at each end for respective electrical connection to a source of high potential, for example a power conductor, and a point at another potential. The insulating body may comprise ceramic, for example porcelain or glass, usually having sheds on its outer surface, or a glass fibre core within a co-extensive housing or covering, for example of polymeric material, which also may be shedded. In each case, the sheds are provided to increase the electrical performance, for example by decreasing the leakage current that may flow along the surface by increasing the leakage path length of the insulator, and to prevent the formation of a continuous moisture path from one end of the insulator to the other. In the latter respect, the sheds may be undercut. In some instances, however, sheds are not necessary, and the outer surface may alternatively be convoluted, to provide a low profile sinusoidal configuration for example.

Examples of porcelain insulator arrangements are potheads, which have an outer convoluted porcelain component filled, for example, with oil or bitumen or other insulating material, whereby the conductor of a single core high voltage cable enters the porcelain chamber at one end and is terminated at a connector at the other end. At the cable inlet end, the metallic cable sheath is electrically connected to an earthed baseplate that is clamped to the porcelain, and the connector is secured to the other end of the porcelain body. Such potheads are manufactured, for example, by Joslyn, 3M and Pirelli. Where the cable is a three-core cable, a compound box is used, in which the cable enters at one end, the cores are separated and are then terminated in individual convoluted hollow porcelain components similar to the potheads described above. The requirement for a convoluted or shedded outer surface on a hollow porcelain component contributes appreciably to the cost of these arrangements.

A polymeric insulator is disclosed in British Patent No. 1,292,276, and comprises a central support, which may be a glass fibre rod or tube, having a metal fitting at each end and an outer surface layer formed from a heat-shrinkable non-tracking insulating polymeric sleeve that extends the entire length of the support and overlaps each end fitting. Cable terminations using polymeric insulating materials, as available from Raychem for example, whilst having different configurations for different cables and voltage ranges, may for example have an outer insulating, non-tracking, weather-resistant heat-shrinkable polymeric sleeve that at one end overlaps the earthed metal shield of the cable and whose other end is adjacent a metal connecting lug that is crimped onto the conductor of the cable. Polymeric assemblies in general are suitable for many applications, and are widely and successfully used, especially in view of their low weight, particularly in relation to porcelain or other ceramic materials, and their resistance to pollution, under most severe conditions, for example at higher voltages and in adverse operating conditions, particularly of heavy pollution. However, electrical activity, localized high temperature and electro-chemical attack, especially at metallic boundaries, can adversely affect polymeric material and reduce the lifetime of the insulator. On the other hand, polymeric materials will usually maintain their mechanical integrity if subjected to mechanical abuse, and are relatively easy to form into complex shapes.

Porcelain is a preferred insulating material in some applications because of its superior resistance to damage by electrical discharges, to weathering, and to chemical attack. However, it is relatively heavy, and is a brittle material which can shatter on impact; in this respect, the convolutions or sheds are particularly vulnerable. Furthermore, porcelain has a high surface free energy, which makes it retentive to dirt. Its manufacturing process requires firing in a kiln, and this is not conducive to the easy manufacture of complex shapes. It is, however, not an expensive material to manufacture into an insulator.

It is one object of the present invention to provide an electrical insulator arrangement that overcomes, or at least alleviates, the problems associated with known insulator arrangements, such as high voltage insulators, for example.

In general, two types of electrical discharge activity will, under polluted conditions, take place on the surface of an insulator. The first type takes place randomly over the entire surface area, and, although the surface is eroded, this activity is not very intense and generally does not seriously damage the insulation. The second type of activity is that which becomes rooted or anchored, for example at a boundary of the insulation with a metal end fitting, or beneath a shed, and thus takes place preferentially over a particular portion of the insulating surface. This latter activity is more intense than the former, and is often the limiting factor in the lifetime of the insulator.

The present invention generally provides, in a first aspect, an electrical insulator arrangement having an outer surface that comprises an electrically conductive component, an insulating non-tracking polymeric component, and an insulating refractory component, wherein the refractory component is positioned at a region where the more intense discharge activity is expected, in operation, to occur.

In accordance with a second aspect of the present invention, there is provided an electrical insulator arrangement having an outer surface that comprises at least one electrically conductive component that provides an electrical connection for the arrangement, an electrically insulating non-tracking polymeric component that provides the major insulating surface area of the arrangement, and an insulating refractory component that spaces the conductive component and the polymeric component from each other.

In the arrangement of the second aspect of the invention, only a minor portion of the insulating surface, that is to say, less than 50% and preferably a much smaller percentage, for example 20%, is provided by the refractory material, so that the relative resistance to mechanical abuse and other advantageous properties of the polymeric material are obtained for the major part, i.e., at least 50%, and preferably at least 80%, of the insulating surface area.

At least one of said components, for example, the refractory component, may form a substrate for at least one other of said components. Alternatively, a separate substrate may be provided for the components. The conductive component may be clamped onto the substrate.

In accordance with a third aspect of the present invention, there is provided an electrical insulator arrangement comprising an elongate substrate of substantially uniform cross-section along its length, the substrate having an outer surface that comprises at least one electrically conductive component substantially at one end thereof, an insulating non-tracking polymeric component extending therealong, and an insulating refractory component positioned at a region where the more intense electrical discharge activity is expected, in operation, to occur.

The substrate may comprise said refractory component.

Thus, in the arrangements of the invention, the electrically critical region at the insulating/conductive boundary is between the conductive component and the discharge-resistant refractory material. The particular configuration of refractory and polymeric components in the present arrangements possesses the advantages of both types of material whilst avoiding their respective disadvantages. That is to say, in said second aspect, for example, the exposed surface area of refractory material is relatively small so as to miniraise the vulnerability of the arrangement to mechanical abuse and to pollution, and also the boundary between the conductive and insulating regions of the arrangement ensures that any damaging leakage discharges normally associated with such a boundary area take place onto the more resistant refractory component and not onto the more vulnerable polymeric component.

To this end, the spacing apart of the polymeric component from the conductive component or components is chosen to ensure, as far as possible, that most of the electrical discharge activity that may take place on the outer surface of the arrangement is confined to the refractory component and kept away from the polymeric component. Thus, the total length of the refractory material exposed on the outer surface of the arrangement should exceed the distance in air that in dry conditions would be sufficient to withstand the operating voltage of the arrangement if that voltage were to be applied directly across that length of refractory material.

The length along the insulator arrangement of the exposed portion of the refractory material is to be selected as the minimum value required consistent with obtaining the advantages, set out above, of both the refractory and polymeric components. This length, and thus the exposed refractory surface area, is to be chosen in dependence on, for example, the design of the insulating arrangement, its operating voltage, and the operating conditions, such as the extent of pollution, and will be larger the higher the operating voltage and the more severe the operating conditions. However, for a cylindrical substrate diameter of about 7.5 cms, the minimum length selected would usually not be less than about 10 ram, would typically be about 20 mm, and would usually not be greater than about 40 min. Furthermore, the larger the diameter of the refractory component, the greater is the likelihood that any discharge activity between the conductive component and the polymeric component, across the surface of the refractory component, will take place at one or more discrete circumferential locations, rather than being spread evenly therearound. Such discrete activity would tend to be more harmful to the polymeric component, owing to the higher current densities involved. In such arrangements, therefore, the length of the refractory component that spaces apart the conductive and polymeric components may have to be longer than would otherwise be apparent.

The arrangements may have a generally elongate configuration, and the components may be colinear. The refractory component may conveniently be manufactured in a simple shape, for example a cylindrical rod or tube. One advantage of this simple configuration is that a cylinder having no protrusions, such as sheds or convolutions, and made of a refractory material, such as porcelain, is inherently mechanically very strong. The required external configuration of the arrangement, for example convoluted or shedded, may conveniently be provided by suitable shaping of the polymeric component. Furthermore, use of polymeric material in place of refractory material has the advantage of appreciably reducing the weight of the arrangement. In one particular advantageous embodiment, the refractory component forms a generally cylindrical core of the arrangement, a conductive component is mounted on one end thereof, and the polymeric component is of generally cylindrical configuration with an outer convoluted or shedded surface and is mounted on the refractory component axially spaced apart from the conductive component. Furthermore, the polymeric component may extend from one end of the refractory component towards a further conductive component at the other end of the arrangement and be spaced from said further component by a further refractory component. The further refractory component may comprise an extension of said refractory component, for example as by being a substrate of the polymeric component.

It is envisaged that more than one polymeric component may be included in the arrangement, and these components may be separated by insulating refractory components. In a linear arrangement, for example, the following components may sequentially constitute the outer surface: a conductive component, for example a metal fitting, at one end, a refractory component, a polymeric component, a further refractory component, a further polymeric component, a still further refractory component, and a further conductive component, for example a metal fitting, at the other end of the arrangement.

The or each polymeric component, or some of a plurality of polymeric components, may have sheds on its outer surface, or, may be convoluted. It is also envisaged that a polymeric component may comprise a shedded and a convoluted outer surface.

The polymeric component may be recovered (for example by heat), or moulded, or push-fitted onto a substrate, which may be a core constituted by the refractory component of the arrangement.

A recoverable article is an article the dimensional configuration of which may be made to change when subjected to the appropriate treatment. The article may be heat-recoverable such that the dimensional configuration may be made to change when subjected to a heat treatment. Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

The polymeric material may be cross-linked at any stage in its production that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Patent 1,440,524, an elastomeric member such as an outer tubular member is held in a stretched state by a second member, such as an inner tubular member, which, upon heating weakens and thus allows the elastomeric member to recover.

The present invention, in embodiments providing for the enclosure of a refractory material within a polymeric material, further provides mechanical protection against fracture, of a hollow porcelain tube, for example, in which sharp edged splinters could otherwise be scattered dangerously into the air. A lightning diverter, for example, may comprise a long hollow housing of porcelain that contains assemblies of semi-conductors, and perhaps also spark gaps. When partially enclosed by a polymeric component in accordance with the present invention, resistance to vandalism is improved, and also any damage occurring at an accidental burst is reduced.

In another embodiment of the invention, a polymeric component may form a generally cylindrical substrate, the refractory component may also be generally cylindrical and be mounted on the polymeric component, with a conductive component mounted on one end of the refractory component and in contact with the polymeric component.

The arrangement of the present invention may also be used with a fibre optic cable that is operated in a high voltage environment. Such a cable and its use is described, for example in British Published Patent Application No. 2,132,788A, the entire disclosure of which is incorporated herein by this reference. The present arrangement may be employed in the earthing system for a fibre optic cable that extends from a conductor at high voltage. In such a system, a polymeric outer jacket of the cable may constitute the polymeric component of the present arrangement, a refractory component, for example in the form of a collar, may be sealed onto the cable, and a conductive component for subsequent earthing, formed for example from two metal half-shells, may be crimped onto the cable and sealed onto that end of the refractory component that is further from the high voltage region of the cable.

The conductive component of the arrangement will usually comprise a metal or alloy, but it may be of other material for example a conductive polymeric material.

The insulating polymeric component of the arrangement, which advantageously is electrically substantially non-tracking, should desirably have good weather resistant properties when it is to be used out of doors, and may comprise a thermoplastic material, which may or may not be cross-linked, a thermoset material, or an elastomeric material. Examples of suitable thermoplastic materials are polyethylene; ethylene co-polymers such as copolymers of ethylene and ethyl acrylate or copolymers of ethylene and ethyl acetate, or blends of ethylene co-polymers and other polymers or copolymers such as copolymers of ethylene and propylene or elastomers such as ethylene, propylene and silicone. Examples of suitable thermoset materials are polyesters and epoxies. Examples of suitable elastomeric materials are EPDM and silicone rubbers. The above-mentioned materials will usually contain fillers to improve their characteristics, for example in respect of weather resistance, non-trackability and erosion resistance. Such fillers may include alumina hydrate and silica. Suitable materials in addition to those mentioned above are described in British Patent Nos. 1,337,951 and 1,337,952. The materials may or may not be recoverable.

The insulating refractory component may, for example, comprise porcelain, a semi-conducive glaze, or other ceramic material, or glass or other vitreous material, or mica or other natural mineral insulating material, including those materials presently used as electrical insulation material in high voltage insulators.

It will also be appreciated that the components of the arrangement may be required to be sealed together, for example to exclude the passage of moisture therebetween. This may be achieved by the provision of a coating of an adhesive or sealant or mastic between the components. Where there is no requirement for the sealing material to provide a mechanical bond, silicone grease may be used, for example. The sealing material should be arranged to exclude water or other contaminants and should have a viscosity such that it does not, in operation of the arrangement, run out from between the components.

Preferably the components of the arrangement are contiguous with one another.

The invention also generally provides a method of forming an electrical insulator arrangement, which arrangement comprises an electrically conductive component, an insulating, and preferably non-tracking, polymeric component, and an insulating refractory component, wherein the components are so arranged that the refractory component is positioned at a region where the more intense electrical discharge activity is expected, in operation, to occur.

In accordance with a further particular aspect of the present invention, there is provided a method of forming an electrical insulator arrangement, wherein a polymeric insulating, and preferably non-tracking, component is arranged to provide the major surface area of the arrangement, at least one electrically conductive component is arranged to provide an electrical connection for the arrangement, and an insulating refractory component is arranged to space the polymeric component and the or each conductive component from each other.

The arrangement provided by the methods may have any or all of the features of the above-described arrangements of the present invention.

Embodiments of electrical insulator arrangements, and methods of forming such arrangements, each in accordance with the present invention, will now be described, by way of example, with reference to the accompanying drawings, in which:

FIG. 3 is a sectional elevational view through an earthing system of a fibre optic cable used in a high voltage environment, employing another embodiment of the arrangement.

Figure 1:
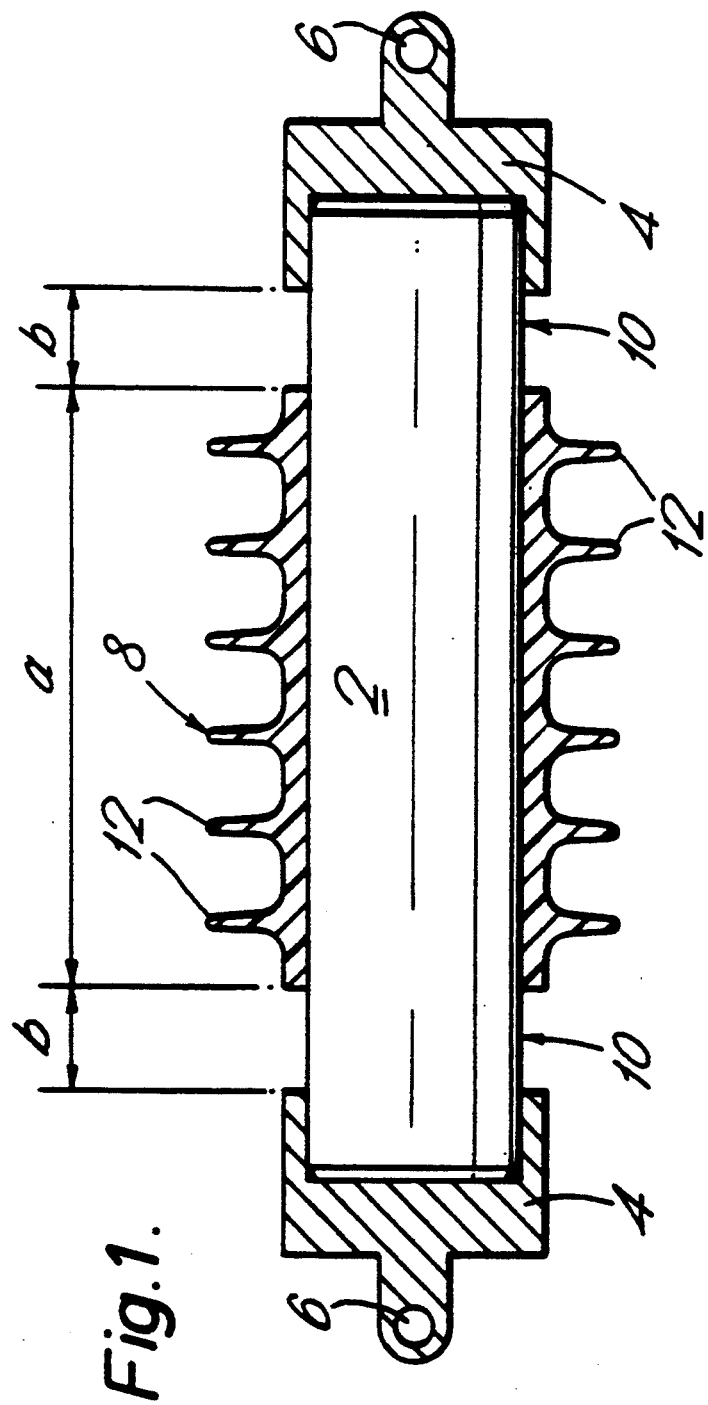
FIG. 1 is a sectional elevational view through a high voltage insulator employing one embodiment of the arrangement.

Referring to FIG. 1, the insulator shown is a 25 kV railway insulator and comprises a solid cylindrical insulating core 2 of porcelain with a galvanised ferrous cap 4, having an attachment eye 6, fixed to each end thereof. A heat-recoverable insulating sleeve 8 is recovered over, and sealed water-tightly onto, a major portion of the length of the porcelain core 2 between the end caps 4, leaving a core portion 10 exposed between the sleeve and each end cap. The sleeve 8 is moulded from cross-linked modified polyethylene, having a substantially non-tracking outer surface. The sleeve 8 is of generally cylindrical configuration so as to conform, on recovery, to the core 2, but has a plurality of annular extensions or sheds 12 projecting from its outer surface. The sheds 12 may form an integral part of the sleeve 8. Alternatively, the sleeve 8 may be of a two-part component comprising a tubular recoverable part onto which a plurality of discrete sheds 12 are affixed.

In the example of the 25 kV railway insulator shown in FIG. 1, which is not to scale, the dimensions of one tested sample are such that the polymeric sleeve length a, and the exposed porcelain length b, at each end of the insulator, are 205 mm, and 65 mm respectively. This sample was subjected to a salt fog test in which salt solution was sprayed into a chamber containing the sample at a concentration of 25 kg of NaCl per cubic meter of water (i.e. about 2.5% by weight) at a flow rate of 1.2 liters/m³/hour. The salt fog spray was applied for 2 minutes and the sample then left for 1 hour, with this cycle being operated fifty times. During the first two cycles, a voltage of 50 kV AC was applied across the ends of the arrangement, and for the remaining forty-eight cycles the operating voltage of 25 kV was applied.

No flashover took place, and although discharge activity was observed on the porcelain component, none was observed on the polymeric component. Thus, on the one hand, the polymeric component has been protected by the refractory components from damaging electrical activity, and on the other hand, the surface area of porcelain exposed is only a small percentage of the total insulating surface area, and the especially vulnerable portions of the arrangement, the sheds 12, are of polymeric material, which will not shatter on impact, and which also has a relatively low surface free energy and is thus not very retentive to dirt.

Table I, below, shows the results of tests carried out to determine the mechanical damage caused by firing ammunition from small weapons at an insulator as shown in FIG. 1, referred to as a hybrid rod, and, for comparison, at an insulator of the same general external configuration but manufactured from porcelain, referred to as standard porcelain. The advantage of the hybrid rod is clearly shown.

TABLE I

| | Gunshot Tests | |
|---|---|---|
| SAMPLE | TEST | RESULTS |
| Hybrid Rod | Shotgun at 6 m range | Pellets encapsulated, no fracture. |
| Standard Porcelain | Shotgun at 6 m range | Severe damage to sheds. |
| Hybrid Rod | 0.22 rifle at 10 m range | Off-centre hit flaked rod. Central hit cracked rod. All retained by sleeve. |
| Standard Porcelain | 0.22 rifle at 10 m range | Shattered: flying splinter: insulator collapsed. |

Table II below shows the results of electrical tests carried out on samples of insulator embodying the present invention. The samples comprised a glass tube of about 1.0 cm diameter having a polymeric sleeve of about 1.1 mm thickness over part of its length. Metal electrodes spaced apart by 50 mm were attached to the tube such that one electrode engaged the polymeric sleeve near one of its ends, and the other electrode was attached to the glass beyond the other end of the polymeric sleeve. The exposed portion of glass between the end of the polymeric sleeve and the electrode is referred to as the width of the refractory band, and tests were carried out, as shown, at different band widths, with the specified voltage applied between the electrodes. The samples were subjected to the inclined plane tracking tests, defined in ASTM D2303 for evaluating polymeric materials, with the refractory band extending from the polymeric sleeve to the lower of the electrodes. Table II shows the time taken before the samples failed, or the time at which the test was terminated.

TABLE II

| | Inclined Plane Tests | | |
|---|---|---|---|
| WIDTH OF REFRACTORY BAND mm | TEST TERMINATED | | |
| | TIME (MIN) | VOLTAGE (KV) | OBSERVATION |
| 0 | 180 | 3.00 | Failure - erosion only. |
| 5 | 430 | 4.25 | Failure - erosion only. |
| 10 | 600 | 4.75 | No failure - slight erosion. |
| 20 | 600 | 4.75 | No failure - negligible erosion. |
| 40 | 600 | 4.75 | No failure - discolouration |

TABLE II-continued

| | Inclined Plane Tests | | |
|---|---|---|---|
| WIDTH OF REFRACTORY BAND mm | TEST TERMINATED TIME (MIN) | VOLTAGE (KV) | OBSERVATION |
| | | | only. |

The advantage of the presence of a refractory band is clear from the observations made, but it will also be noted that a width of the refractory band of greater than 20 mm gives no additional benefit under the test conditions. Accordingly, such an optimum length should be determined for the actual operating conditions of the insulator arrangement, so as to maximise the surface area to be protected by the polymeric component.

In the arrangement exemplified by FIG. 1, one of the components, the refractory component, acts as a substrate, that is to say a support, for the other components. However, a substrate that is independent of these components may be provided. Such an independent substrate may be made from a material, such as glass fibre, that is vulnerable to electrical activity, and thus would need to be protected; this may conveniently be done by mounting the components on the substrate such that the surface of the substrate is not exposed to any electrical activity. Such arrangements are exemplified by FIGS. 2, 2A, 2B and 2C.

Each insulator shown schematically in FIGS. 2, 2A, 2B and 2C has a solid cylindrical core 40 that provides a mechanical support for the conductive components and insulating polymeric and refractory components that make up the insulator.

In the configuration 42, a polymeric sleeve 44 conforms to and extends along the core 40 and is axially spaced apart from a metal end cap 46 that is mounted directly onto the core 40. A cylindrical porcelain collar 48 bridges the space between and overlaps the polymeric sleeve 44 and the end cap 46.

Figure 2:
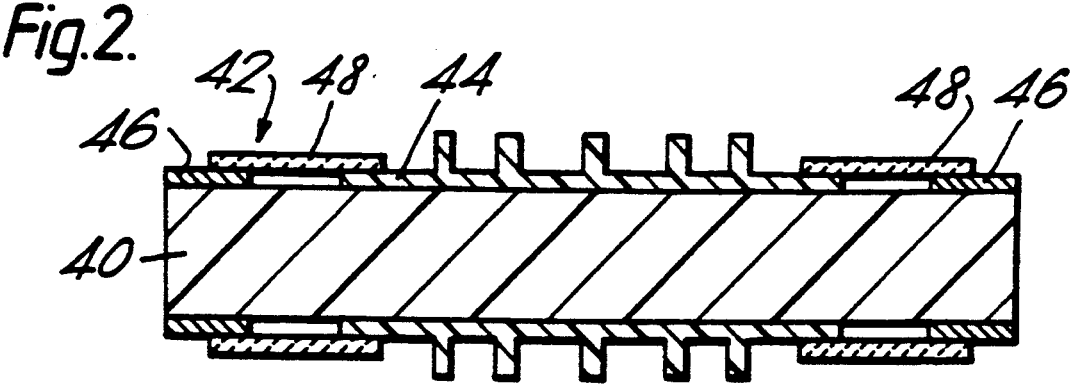
FIGS. 2, 2A, 2B and 2C are schematic sectional elevational views showing four alternative insulator arrangements.
Figure 2A:
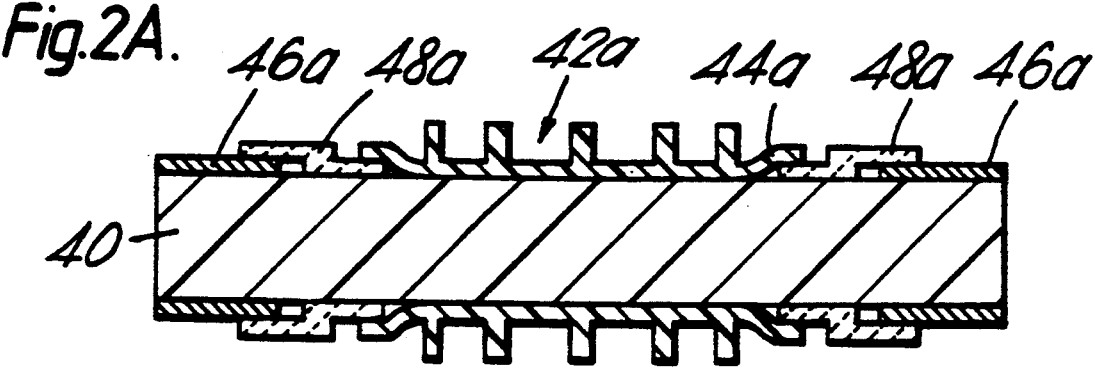
Figure 2B:
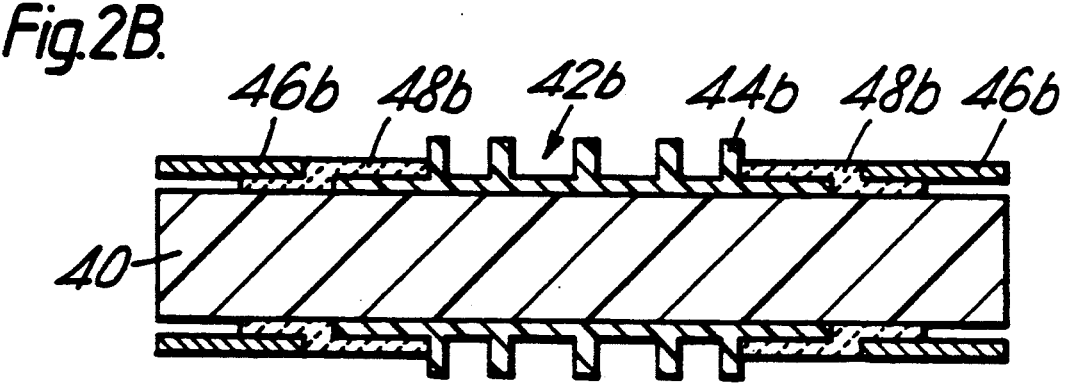
Figure 2C:
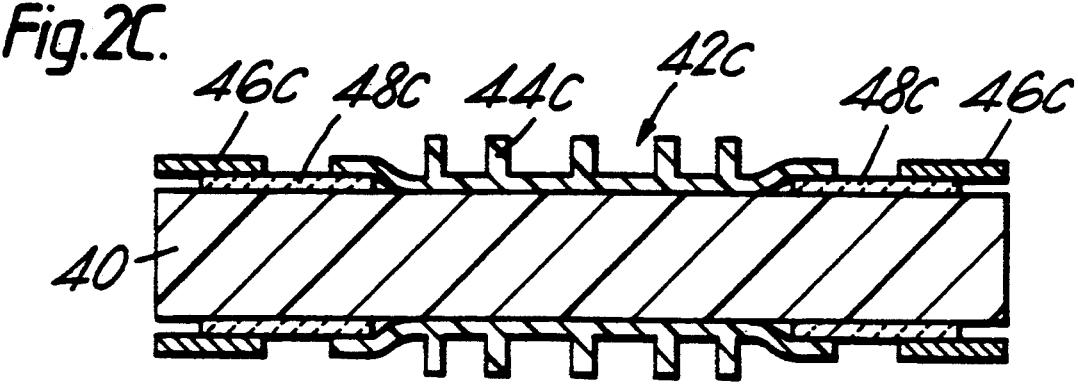

In the other configurations 42a, 42b and 42c now to be described, with reference to FIGS. 2A, 2B and 2C, respectively, components that are of the same material as the components of configuration 42 will be identified by corresponding reference numerals having suffixes a, b and c added respectively except for the core, which is labelled 40 in each of the figures.

In configuration 42a of FIG. 2A, the porcelain collar 48a is stepped such that at one end it passes over the metal end cap 46a whilst at its other end it is disposed beneath the extremity of the polymeric sleeve 44a.

In configuration 42b of FIG. 2B, the porcelain collar 48b is stepped, but is fitted onto the core 40 in reverse manner to the way it is fitted in the configuration 42a. Thus, the extremity of the polymeric sleeve 44b fits beneath one end of the collar 48b and the metal end cap 46b fits over the other end of the collar.

In configuration 42c of FIG. 2C, the porcelain collar 48c is cylindrical, but in contrast to the configuration 42, is mounted directly onto the core 40 and is itself overlapped at each end, by the polymeric sleeve 44c and the metal end cap 46c respectively.

In each of the configurations 42, 42a, 42b and 42c, as in the arrangement of FIG. 1, the polymeric component is spaced apart from the conductive component by a refractory component, thus protecting the polymeric component from damaging electrical activity.

It will be appreciated that the order of assembly of the components of the insulator may be determined by the construction, for example recoverable or push-on, of the polymeric component.

Referring to FIG. 3, a fibre optic cable 20 is helically wound around a bare metal 33 kV overhead conductor 22 to transmit information between power distribution substations, one of which is shown schematically at 24. The cable 20 is demounted from the conductor 22 by means of an arrangement shown schematically at 26 and described in detail in British Patent Application Publication No. 2,132,788A, so that it may safely be brought to the earthed receiving station 24. The cable 20 has an insulating polymeric non-tracking outer jacket that on the conductor 22 is at 33 kV and that at the station 24 is at earth potential. Just prior to entering the station 24, an electrical connection is made by means of an insulator arrangement 28 from the cable to an earth point 30. The arrangement 28 comprises a two part porcelain collar 32 that has a convoluted outer surface and that is sealingly secured around the cable 20, and a pair of metal half-shells 34.

At the upper ends, the shells 34 are arranged to receive and retain the collar 32, and at their narrow lower ends the shells are crimped onto the cable 20. The half-shells 34 are electrically connected to the earth point 30. Any discharges arising from leakage current flowing down the optical cable will tend to occur at the boundary at the upper end of the metal half-shells 34 with the porcelain collar 32 and not at the electrically-vulnerable boundary at the upper end of the collar 32 with the polymeric cable jacket. Significant damage to the optical cable jacket resulting from discharge activity, is thus avoided.

It will be appreciated that, in addition to the specific applications described, the arrangement and method of the invention may also be employed in other applications, in cable terminations and bushings for example, where although it would generally be advantageous to use a polymeric insulating component, the proximity of a conductive component could adversely affect the life of the polymeric material.

It will further be appreciated that a polymeric component may be added to a refractory component that provides an insulating surface of an existing device, a high voltage insulator for example, to produce an arrangement in accordance with the present invention, whereby the performance of the device may be upgraded in a particularly convenient manner. For example, a shedded polymeric component may be added to a high voltage porcelain insulator thereby to improve its impulse performance or to convert it from an indoor insulator to one suitable for use outdoors.

We claim:

1. An electrical insulator comprising:
   a) an elongated generally cylindrical support member formed from electrically insulating and non-tracking refractory material;
   b) an electrically conductive component mounted at each end of the support member; and,
   c) an electrically insulating and non-tracking polymeric component;
   in which said polymeric component has a plurality of annular extensions spaced apart longitudinally on an outer surface thereof, and is mounted on said refractory support member so as (A) to extend longitudinally thereof, (B) to be spaced apart at each end by said refractory support member from respective ones of said conductive components, and (C) to provide the major insulating surface area of the insulator.

2. An electrical insulator comprising:
a) an elongated generally cylindrical support member formed from electrically insulating and non-tracking refractory material;
b) an electrically conductive component mounted at each end of the support member; and,
c) a plurality of electrically insulating and non-tracking polymeric components, at least one of which has a plurality of annular extensions spaced apart on an outer surface thereof;
in which said polymeric components are mounted on said refractory support member (A) so as to extend longitudinally thereof, (B) such that a near end of a first of said polymeric components and a far end of a last of said polymeric components are spaced apart from respective ones of said conductive components by said refractory support member, and (C) so as to provide the major insulating surface area of the insulator.

3. An electrical insulator as claimed in claim 1 or claim 2, in which said annular extensions comprise sheds.

4. An electrical insulator as claimed in claim 1 or claim 2, in which said annular extensions comprise convolutions.

5. An electrical insulator as claimed in claim 1 or claim 2, in which said polymeric component comprises a hollow generally cylindrical core portion integral with said extensions.

6. An electrical insulator as claimed in claim 1 or claim 2, wherein said conductive component comprises a material selected from the group consisting of metal, alloy, and a conductive polymeric material.

7. An electrical insulator as claimed in claim 1 or claim 2, wherein the or each said polymeric component comprises a material selected from the group consisting of a thermoplastic, a thermoset, and an elastomeric material.

8. An electrical insulator as claimed in claim 7, wherein said polymeric component is recoverable.

9. An electrical insulator as claimed in claim 8, wherein said recoverable polymeric component is heat-recoverable.

10. An electrical insulator as claimed in claim 1 or claim 2, wherein said refractory support member comprises a material selected from the group consisting of porcelain, other ceramic material, a semi-conductive glaze, glass, other vitreous material, mica, and other natural mineral insulating material.

11. A method of forming an electrical insulator comprising:
a) providing an elongated generally cylindrical support member formed from electrically insulating and non-tracking refractory material; and
b) mounting an electrically conductive component at each end of said support member; and
c) mounting onto said support member an electrically insulating and non-tracking polymeric component, that has a plurality of annular extensions spaced apart longitudinally on an outer surface thereof, such that the polymeric component (A) extends longitudinally of said support member, (B) is spaced apart at each end from respective ones of said conductive components by said refractory support member, and (C) provides the major insulating surface area of the insulator.

12. A method as claimed in claim 1, in which said polymeric component is recoverable, and the step of mounting said polymeric component includes recovering it onto said support member.

13. A method as claimed in claim 12, in which the step of recovering is effected by heat.

14. A method of forming an electrical insulator comprising:
a) providing an elongated generally cylindrical support member formed from electrically insulating and non-tracking refractory material; and
b) mounting an electrically conductive component at each end of said support member; and
c) mounting onto said support member a plurality of electrically insulating and non-tracking polymeric components, at least one of which has a plurality of annular extensions spaced apart on an outer surface thereof, such that (A) the polymeric components extend longitudinally of said support member, (B) a near end of a first of said polymeric components and a far end of a last of said polymeric components are spaced apart from the respective ones of said components by said refracting support member, and (C) the polymeric components provide the major insulating surface area of the insulator.

* * * * *